June 4, 1963 K. G. TIMMERMANN 3,092,048
ADJUSTABLE TABLE
Filed June 19, 1961
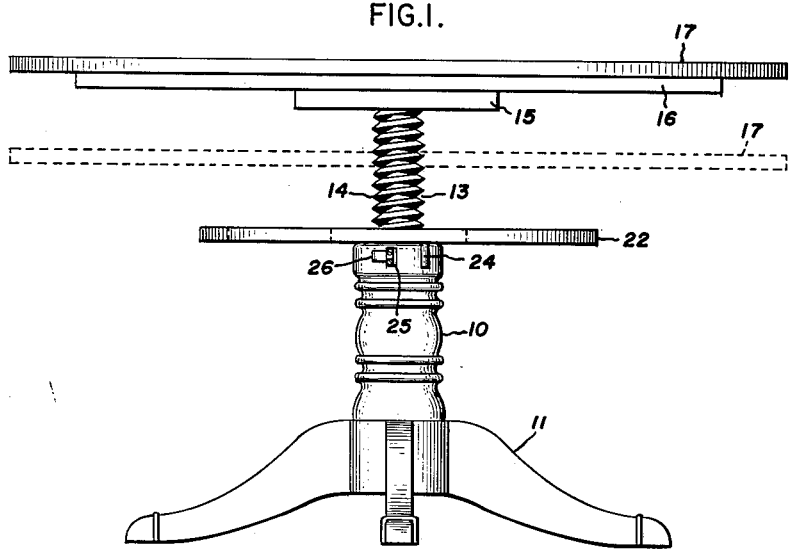
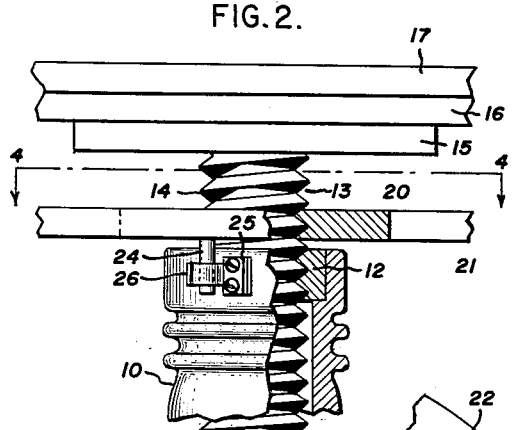
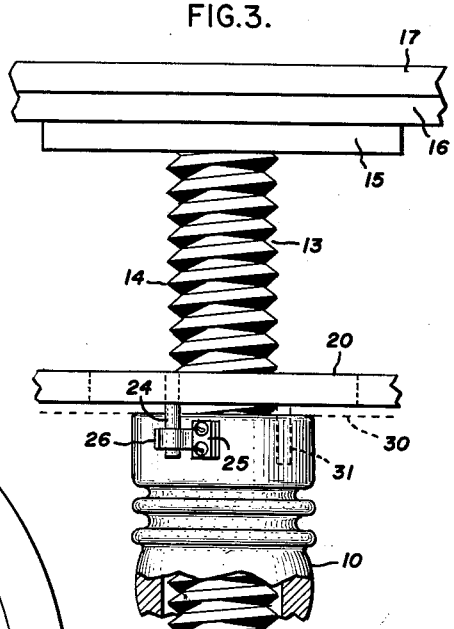
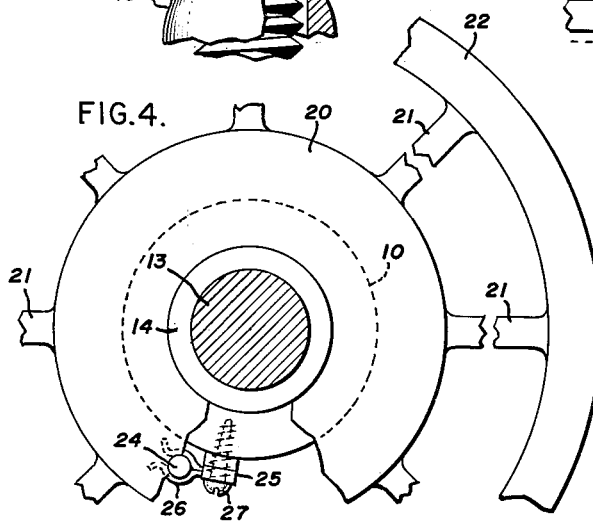
INVENTOR:
KARL G. TIMMERMANN,
BY *A. Emmett Thompson*
HIS ATTORNEY.

United States Patent Office 3,092,048
Patented June 4, 1963

3,092,048
ADJUSTABLE TABLE
Karl G. Timmermann, Fayetteville, N.Y., assignor to Louise B. Stickley, Fayetteville, N.Y.
Filed June 19, 1961, Ser. No. 118,189
2 Claims. (Cl. 108—138)

This invention relates to tables of the type used in dwellings, and has as an object a table embodying a structural arrangement providing for adjustment of the table top vertically, and for fixedly securing the table top to the supporting pedestal in any adjusted position.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a side elevational view of a table embodying my invention.

FIGURE 2 is an enlarged view in elevation of the upper portion of the supporting pedestal and screw structure for supporting the table top, with parts broken away and parts in section, and with the locking nut released to permit rotation of the screw.

FIGURE 3 is a view similar to FIGURE 2 in elevation showing the table top elevated from the position shown in FIGURE 2.

FIGURE 4 is a view taken on line 4—4, FIGURE 2.

The table consists of a hollow supporting pedestal 10 mounted on a foot structure 11. A nut 12 is fixedly mounted in the upper end of the pedestal. A screw 13 is vertically disposed in the column 10 and is threaded into the nut 12. The screw 13 is of relatively large diameter and provided with a relatively coarse thread 14 complemental to the thread in the nut 12. A plate 15 is fixedly secured to the upper end of the screw 13, and a batten 16 is fixedly secured to the plate 15, and a table top 17 is, in turn, fixedly secured to the batten 16.

It will be apparent, upon rotation of the table top 17, rotation is imparted to the screw 13, whereby the table top 17 may be adjusted vertically.

To provide free rotation of the screw 13 in the nut 12, it is necessary to provide some clearance between the screw and the nut. This clearance is especially necessitated if the screw and/or nut are formed of wood, the dimensions of which are subject to change by change in atmospheric conditions. This clearance results in the table top not being rigidly secured to the pedestal 10, with the result there would be some wobble to the table top, and it would be further likely to rotate especially in a direction to thread the screw downwardly in the nut. To overcome this situation, a lock nut 20 is threaded on the screw 13 above the upper end of the pedestal 10. The lock nut 20 is provided with a plurality of radially extending spokes 21 which merge at their outer ends with circular rim 22. The spokes 21 are of substantial length, and accordingly, this arrangement provides a hand wheel of substantial diameter positioned below the table top 17 to provide for the convenient rotation of the lock nut 20. When the lock nut 20 is rotated to thread downwardly on the screw 13, it is moved into engagement with the upper end of the pedestal 10 and thus, in conjunction with the nut 12, fixedly locks the screw 13 against rotation and provides for a rigid support for the table top 17.

In order to thread the screw 13 upwardly through the nut 12, it is first necessary to rotate the lock nut 20 to effect movement upwardly on the screw, out of engagement with the pedestal top. Normally, rotation of the table top and screw thereafter would effect rotation of the lock nut, moving it further upwardly away from the pedestal top if the table were being adjusted upwardly. If it were desired to adjust the table downwardly, the lock nut, after being loosened, would move downwardly with the screw and engage the pedestal top, and lock the screw against further downward movement.

To obviate these difficulties, I provide the lock nut with a depending projection in the form of a pin 24 mounted to move in a circular path above the upper end of the pedestal 10. I also provide a stop 25 for the pin 24 fixedly secured to the pedestal. This stop member is provided with a pair of jaws 26 formed of spring material, the jaws being fixedly secured to the pedestal, as by screws 27. The jaws face in a direction in which the lock nut is rotated when moved toward locking position. If the thread 14 on the screw is right-hand, the lock nut, upon rotation in a clockwise direction, FIGURE 4, would be moved downwardly on the screw into locking engagement with the pedestal. When the lock nut is rotated in a counter-clockwise direction from lock position, it is threaded upwardly on the screw 13 out of engagement with the pedestal 10. This counter-clockwise rotation is effected until the pin 24 enters the spring jaws 26 of the stop member whereupon, the jaws yieldingly clamp the stop pin, and this yielding or frictional engagement of the pin 24 by the jaws 26 is sufficient to restrain clockwise movement of the lock nut toward lock position when the table top and screw are rotated in a clockwise direction to lower the table top.

It will be apparent that the lock nut 20 cannot rotate further in a counter-clockwise direction as it is fixedly restrained against such rotation by the stop member. This arrangement permits the table top to be rotated in either direction for vertical adjustment after the lock nut has been moved to unlocked position. However, the stop member and pin restrains any rotation of the lock nut during adjustment of the table. After the table has been adjusted to the desired height, the lock nut is rotated in a clockwise direction, FIGURE 4, by manipulation of the rim 22 of the lock nut hand wheel.

In the assembly of the table components, the stop member is secured to the pedestal with the pin 24 engaged by the jaws 26 with the lock nut loosened and moved upwardly from the top of the pedestal a slight distance whereby, the table top and screw may be freely rotated in either direction to adjust the height of the table. After such adjustment, the screw is fixed against movement relative to the pedestal by imparting less than one revolution in a clockwise direction, FIGURE 4, to the lock nut. For example, in FIGURE 1, the lock nut is shown in locked position and it will be observed that the pin 24 is spaced circumferentially from the stop member 25. In FIGURE 2, the pin 24 is shown engaged by the stop member, the lock nut 20 being spaced upwardly a slight distance from the top of the pedestal to permit free rotation of the table top and screw. FIGURE 3 illustrates the table top having been rotated and elevated from the position shown in FIGURE 2. If it is desired to lock the table top in this position, the lock nut is rotated in a clockwise direction, moving the lock nut downwardly into locking engagement with the pedestal top, as indicated by the dotted line 30, FIGURE 3, and with the lock nut engaging the pedestal top, the pin will have moved to the dotted line position 31.

The table structure described provides for conveniently adjusting the table top from a lower level, for such uses as card playing, to a higher level for dining, and the arrangement provides for the table top being rigidly secured to the pedestal at all adjusted heights.

What I claim is:

1. An adjustable table comprising a pedestal, an internally threaded nut fixed in said pedestal, a screw threaded in said nut, a table top fixed to the upper end of said screw, a lock nut threaded on said screw above said pedestal and rotatable on said screw into and out of locking engagement with the pedestal to lock said screw against rotation, said locking nut being formed with a hand wheel of substantial diameter extending radially from said screw below said table top, the upper portion of said pedestal and said lock nut having inter-engaging means operable to limit free rotation of said lock nut to less than one revolution from locking position to unlock position and to yieldingly restrain rotation of said locking nut in a direction toward locking position.

2. A table adjustable to various heights comprising a supporting pedestal, an internally threaded nut fixed to the upper end of said pedestal, a screw threaded in said nut and having a table top fixedly secured to its upper end, a lock nut threaded on said screw above said pedestal and rotatable on said screw into and out of locking engagement with said pedestal to lock said screw against rotation, said lock nut being provided with a depending projection movable in a circular path about the upper end of said pedestal upon rotation of the lock nut, a stop member fixedly secured to the pedestal for engagement by said depending projection upon rotation of said lock nut less than one revolution in a direction away from locking position, said stop member being operable to yieldingly restrain free movement of said lock nut and projection upon rotation of said lock nut in a direction toward locking position.

References Cited in the file of this patent

UNITED STATES PATENTS

| | | |
|---|---|---|
| 59,261 | Postawka | Oct. 30, 1866 |
| 287,913 | Dawson et al. | Nov. 6, 1883 |
| 694,401 | Marsolais | Mar. 4, 1902 |
| 718,682 | Wenrich | Jan. 20, 1903 |
| 1,171,523 | Kuhn | Feb. 15, 1916 |
| 1,373,473 | Weydell | Apr. 5, 1921 |
| 1,483,051 | Saunders | Feb. 5, 1924 |
| 1,604,445 | Hem | Oct. 26, 1926 |
| 2,247,235 | Hause | June 24, 1941 |
| 2,570,183 | Weber | Oct. 9, 1951 |